(12) United States Patent
Tyndall

(10) Patent No.: US 6,704,809 B2
(45) Date of Patent: Mar. 9, 2004

(54) METHOD AND SYSTEM FOR OVERLAPPING DATA FLOW WITHIN A SCSI EXTENDED COPY COMMAND

(75) Inventor: John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 193 days.

(21) Appl. No.: 10/085,918

(22) Filed: Feb. 28, 2002

(65) Prior Publication Data

US 2002/0156942 A1 Oct. 24, 2002

Related U.S. Application Data

(60) Provisional application No. 60/272,339, filed on Feb. 28, 2001.

(51) Int. Cl.$^7$ .............................................. G06F 13/00
(52) U.S. Cl. .................. 710/5; 710/7; 710/20; 710/21; 710/29; 710/33; 710/36
(58) Field of Search .......................... 710/5, 7, 20, 21, 710/29, 33, 36

(56) References Cited

U.S. PATENT DOCUMENTS 6,163,818 A  * 12/2000 Nguyen et al. ................ 710/22
6,490,635 B1 * 12/2002 Holmes .......................... 710/3
6,654,852 B2 * 11/2003 Kanamaru et al. ........... 711/113

OTHER PUBLICATIONS

PCT Search Report dated Oct. 31, 2002.
Wilson, "Working Draft SCSI Extended Copy Command," 'Online!' Apr. 2, 1999. T10 Technical Committee, document XP002217164.
Weber, "Corrections to Extended Copy," 'Online!' Apr. 13, 2000. T10 Technical Committee, document XP002217165.

* cited by examiner

Primary Examiner—Jeffrey Gaffin
Assistant Examiner—Mohammad O. Farooq
(74) Attorney, Agent, or Firm—Gray Cary Ware & Freidenrich LLP

(57) ABSTRACT

Methods and systems for overlapping data flow within an extended copy command over a network, including, at a router in a network: receiving an extended copy command from a first host to a first target device; determining an initial network status if the network status is unknown; initializing a set of read-write parameters; and executing the extended copy command for a first segment of the extended copy command, and for one or more subsequent segments, by overlapping one or more read and one or more write commands of the extended copy command. Methods and systems for overlapping data flow within an extended copy command over a network, including, at a router in a network: receiving an extended copy command from a first host to a first target device; determining an initial network status if the network status is unknown; initializing a set of read-write parameters; and executing the extended copy command for a first segment of the extended copy command, and for one or more subsequent segments, by overlapping one or more read and one or more write commands of the extended copy command. Methods and systems for overlapping data flow within an extended copy command over a network, including, at a router in a network: receiving an extended copy command from a first host to a first target device; determining an initial network status if the network status is unknown; initializing a set of read-write parameters; and executing the extended copy command for a first segment of the extended copy command, and for one or more subsequent segments, by overlapping one or more read and one or more write commands of the extended copy command.

8 Claims, 2 Drawing Sheets

METHOD AND SYSTEM FOR OVERLAPPING DATA FLOW WITHIN A SCSI EXTENDED COPY COMMAND

RELATED INFORMATION

This application claims priority under 35 U.S.C. §119 (e) to United States Patent Application No. 60/272,339, entitled "Method and System for Reconciling Target Descriptor Length of the SCSI Extended Copy Command" by John Tyndall, filed on Feb. 28, 2001, which is incorporated y reference as if set forth in its entirety herein.

TECHNICAL FIELD OF THE INVENTION

This invention relates generally to data and information communication systems and their operation, and, more particularly, to the field of storage area networking. Even more particularly, the present invention relates to Fibre Channel-to-SCSI storage area networks (SANs) and to a method and system for overlapping data flow from source to destination within a SCSI extended copy command.

BACKGROUND OF THE INVENTION

Dramatic growth in the amount of data that organizations must store combined with the need for faster, more reliable and more efficient data access and data management capabilities, have led many organizations to seek improved ways of storing, accessing and managing data. In traditional computer the prevailing computer protocol used to connect network components and transfer data between, for example, a server and storage device, is the small computer system interface, or "SCSI". As data storage and retrieval requirements increase, the need for fast, efficient and reliable data storage and retrieval solutions is also increasing.

For example, one problem existing in the SCSI protocol is that when performing a data backup operation, a host device will typically read data from a source device into the host device and then write the data to a destination device, for example, a tape backup drive. The host device thus remains occupied during the entire backup operation, and its resources cannot be devoted to other operations. Furthermore, in most organizations today, data backup—creating a duplicate copy of data to protect it from corruption or loss—is accomplished by moving large volumes of stored data from a dedicated storage device over a primary computer network to a backup storage device. Since the primary computer network is also responsible for conducting day-to-day computing operations, this added data movement results in substantial congestion, slowing day-to-day computing operations.

The SCSI protocol extended copy command and the use of storage area networks (SANs), which are computer networks dedicated to data storage, can help resolve some of these problems. The SCSI extended copy command is a copy command that releases the host's resources during a backup operation by transferring responsibility for performing the backup operation to a different processor on a copy manager device, such as a router (e.g., a Fibre Channel-to-SCSI router), that supports the extended copy command. The host is thus free to perform other operations for the network while the copy manager device directs the backup operation.

Storage area networks use a different, higher performance, computer protocol, known as Fibre Channel, to transfer data. A storage area network also allows many servers to connect to and share access to many storage devices. The many-to-many connection enabled by the storage area network, combined with the Fibre Channel protocol, permits faster, more efficient, more reliable and more manageable data transfer processes. Furthermore, a storage area network can be used to perform data backup operations instead of the primary computer network, thus substantially reducing congestion on the primary computer network and allowing more efficient day-to-day network operations.

Most current storage devices continue to be sold with the small computer system interface. Additionally, most organizations have made significant investments in storage devices and servers that use the small computer system interface. Therefore, in order for storage area network devices that use Fibre Channel to function with storage devices that use SCSI, Fibre Channel-to-SCSI storage routers must be installed between these devices. In particular, storage routers are essential to shifting data backup processes from a primary computer network to the storage area network, since most data backup storage devices use the SCSI interface and can only connect to the storage area network through a storage router. As new computer protocols are introduced, storage routers will be increasingly essential to enable rapid, seamless communication among servers, storage devices and storage area network devices that use diverse protocols.

However, current implementations of the SCSI extended copy command only support serialized data transfer operations. Current implementations of the SCSI extended copy command perform data transfers by first performing a single read from a source followed by a single write to a destination. This means that only one device, whether the source or the destination, is being utilized at any given time. Therefore, either the source or the destination device, alternately, is left waiting, resulting in poor data transfer performance.

An extended copy command may have multiple segments, with each segment designated a data transfer operation between a source and a destination. Current implementations of the extended copy command thus must first read in all of the data requested from a source device and then write out all of that data to the destination device for each segment, in a serial sequence. Although logically this arrangement is very simple to implement, performance is slow due to the serial nature of the data transfers involved. There is no overlap of read and write operations between destination and source devices, either within a segment or between segments in an extended copy command.

Present implementations of the SCSI extended copy command thus cannot provide for overlap between data reads and data writes either within a single segment or between segments of an extended copy command. Streaming of data between a source and a destination as part of executing an extended copy command is therefore not possible under current implementations of the extended copy command.

Further, because data cannot be consistently streamed using current implementations of the extended copy command, streaming devices, such as backup tape devices, may have to start and stop continuously. This is because the requested data must first be read before a write can be performed at the destination device. Simultaneous read and writes are not possible. As a result, the sequential access device may have to be stopped following a write operation while a read is performed, and then started again when a write is performed. These starts and stops are mechanical operations which can result in performance decreases. These performance decreases can be reduced or eliminated if data can be streamed to the backup device.

SUMMARY OF THE INVENTION

Therefore, a need exists for a method and system for overlapping data flow within an extended copy command that can simultaneously read data in from a source device and write data out to a destination device, thus allowing for overlapping read and write commands.

Furthermore, a need exists for a method and system for overlapping data flow within an extended copy command that can provide for simultaneous reading from a source device and writing to a destination device across segments within an extended copy command. In this way, data flow overlap can occur between the potentially multiple segments of an extended copy command.

An even further need exists for a method and system for overlapping data flow within an extended copy command that can be implemented as software instructions within a router, such as Fibre Channel-to-SCSI router, in a network, such as a Fibre Channel-to-SCSI network.

Further still, a need exists for a method and system for overlapping data flow within an extended copy command that can provide for streaming data to a network device, such as a tape drive, to reduce or eliminate starts and stops of the device, and the consequent performance penalties that accompany these operations, typical with current implementations of the extended copy command.

The present invention provides a method and system for overlapping data flow within a SCSI extended copy command that substantially eliminates or reduces the disadvantages and problems associated with the use of the SCSI extended copy command, such as those associated with the SCSI extended copy command such as those associated with the SCSI extended copy command presently implemented in the T10/99-143r1 specification.

In particular, the present invention provides a method for overlapping data flow within an extended copy command over a network, one embodiment of the method comprising, at a router in the network: receiving an extended copy command from a first host to a first target device; if the network status is unknown, determining an initial network status; initializing a set of read-write parameters; and executing the extended copy command for a first segment of the extended copy command and for one or more subsequent segments by overlapping one or more read and one or more write commands of the extended copy command. Executing the extended copy command can further comprise issuing a set of initial commands for the first segment of the extended copy command; issuing a set of initial commands for each subsequent segment of the extended copy command as it is received; performing a read completion operation for each segment of the extended copy command; and performing a write completion operation for each segment of the extended copy command. Execution of the extended copy command for one segment need not be complete before execution of a subsequent segment is commenced. Similarly, execution of the extended copy command for each segment need not be completed in sequence (i.e., a subsequent segment's read/write sequence can be completed before the read/write sequence of a prior segment is complete). Issuing the set of initial commands can comprise executing an initial commands algorithm. Performing the read completion and the write completion operations can comprise executing a read completion algorithm and executing a write completion algorithm, respectively.

The method and system for overlapping data flow within an extended copy command of this invention provide a technical advantage in that they can provide for simultaneously reading data in from a source device and writing data out to a destination device, thus allowing for simultaneous outstanding read and write commands.

Another technical advantage of the method and system of the present invention is that they can provide for simultaneous reading from a source device and writing to a destination device across segments within an extended copy command.

Still another technical advantage of the method and system of the present invention is that they can be implemented as software instructions within a router in a network.

Yet another technical advantage of the method and system for overlapping data flow within an extended copy command of the present invention is that they can provide for streaming data to a network device, such as a tape drive, to reduce or eliminate the starts and stops of the device, and the consequent performance penalties that accompany these operations, typical with current implementations of the extended copy command.

BRIEF DESCRIPTION OF THE DRAWINGS

A more complete understanding of the present invention and the advantages thereof may be acquired by referring to the following description, taken in conjunction with the accompanying drawings, in which like reference numbers indicate like features and wherein.

DETAILED DESCRIPTION OF THE INVENTION

Figure 1:
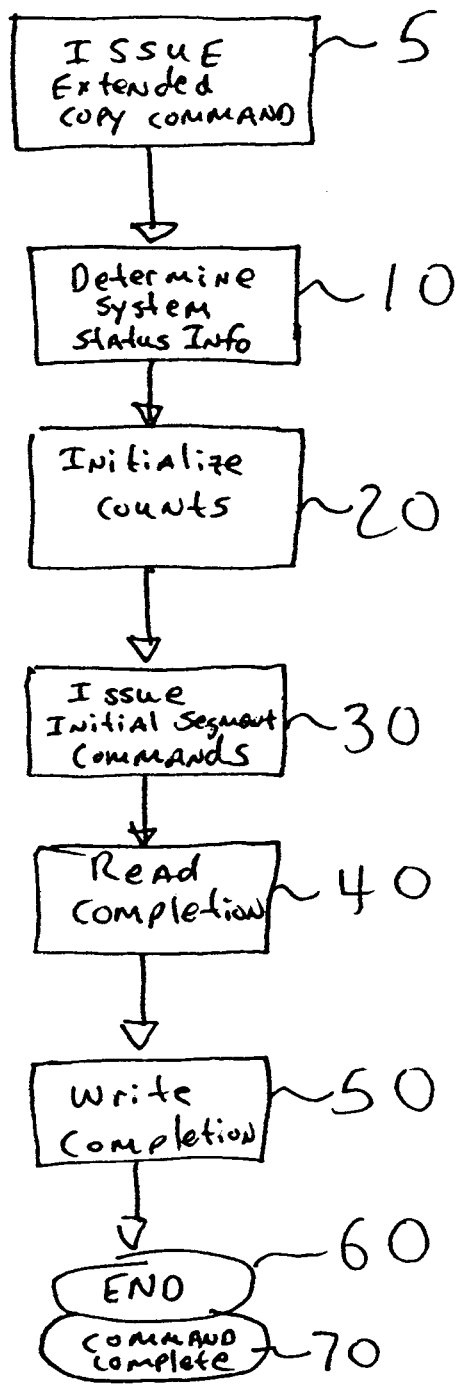
FIG. 1 is a flow chart of one embodiment of the method of this invention for overlapping data flow within an extended copy command.

Preferred embodiments of the present invention are illustrated in the figures, like numerals being used to refer to like and corresponding parts of various drawings.

The present invention provides a method and system for overlapping data flow within an extended copy command, embodiments of which can be used to stream data read from a source while simultaneously streaming data in a write operation to a destination device. In this way, read commands to a source device and write commands to a destination device can be simultaneously outstanding, thereby reducing or eliminating the limitations of the serial read-write implementation of the currently existing extended copy command.

The embodiments of the method and system of this invention can be used to overlap data flow within individual segments of an extended copy command as well as to overlap data flow across segments within an extended copy command. In this way, a read/write operation within an individual segment need not be complete before the read/write operation of a subsequent segment can begin.

The method and system of the present invention can be implemented as, and comprise, computer executable software instructions that can be stored within memory in a router (e.g., a Fibre Channel-to-SCSI router such as those manufactured by Crossroads Systems, Inc. of Austin, Tex.). The computer executable software instructions of the present invention can further comprise copy manager software, implemented within a storage router, that can act as a copy manager for the extended copy command.

In accordance with the teachings of the present invention, a router such as a Fibre Channel-to-SCSI router can receive an extended copy command from a host to perform a backup operation in accordance with the extended copy command specification. The extended copy command can be received from a SCSI host or a Fibre Channel host, either of which can be within a network such as the Fibre Channel-to-SCSI network. In this way, the resources of the host issuing the extended copy command are left free to perform other tasks within the computer network. The SCSI extended copy command specification is laid out in the T10/99-143r1 specification.

The extended copy command comprises in part a parameter list, which defines a target descriptor list. The target descriptor list identifies the targets the command will be using and the data movements that are to be performed between the targets. The target descriptor list also identifies the individual segments of the extended copy command, which can contain unique information for each read/write operation. Each target descriptor can contain information that identifies a device, such as the device type, the device address, and the type of information the device will process.

An extended copy command can contain multiple segments.

Each segment is essentially a command that initiates the movement of some specified data from a source to a destination. The device receiving the extended copy command from a host is called a copy manager, and can comprise a router, such as Fibre Channel-to-SCSI router, in accordance with the teachings of this invention. The copy manager takes over the extended copy command operation and manages the actual movement (reading and writing) of data between source and destination devices.

The method and system of this invention can be implemented as computer executable software instructions that can be stored within memory in a copy manager device, such as a router. The memory can comprise RAM or ROM, or other storage media, such as a hard drive, as known to those in the art. The storage router can be a component within a storage area network, which can itself be a Fibre Channel-to-SCSI network.

FIG. 1 is a simplified flow chart describing one embodiment of the method of this invention for overlapping data flow within an extended copy command. To process an extended copy command segment that causes the movement of data from a source device to a destination device, the copy manager device must issue read commands to the source device and write commands to the destination device. The source device and the destination device can be SCSI devices or Fibre Channel devices (or a combination of the two), such as streaming tape drives, sequential access devices (such as CD-ROMs), hard drives, or any other storage device known to those in the art.

A simple processing algorithm, such as those currently in use, would perform this operation by first performing a read operation from the source device followed by a write operation to the destination device, with only a single command (read or write) outstanding at any time. However, by allowing the reads and writes to overlap, as is made possible by the present invention, the data movement can be accomplished more efficiently while executing an extended copy command.

Returning now to FIG. 1, at step 5, a host issues an extended copy command to a copy manager device. The host can be a Fibre Channel host or a SCSI host, and the copy manager can be a Fibre Channel-to-SCSI router. At step 10, within the copy manager device, the method and system of this invention determine the initial system (network and router) status information. Step 10 need only be performed when the initial system (network and router) status is not known, and not for every subsequent extended copy command. When first executing a segment of an extended copy command, the following information(parameters)is known:

bytes_waiting: the amount of data that may be left over after processing the last segment. Bytes_waiting is updated while processing the segment.

expected_bytes_read: the number of bytes that will be read by a segment.

expected_bytes_written: the number of bytes that will be written by a segment.

low_water_mark: the minimum amount of data the copy manager device attempts to keep in a holding buffer.

read_transfer_size: the maximum number of bytes moved in a single write command.

write_transfer_size: the maximum number of bytes moved in a single write command.

At step 20, the method and system of this invention initialize a set of counts (parameters), which can then be updated while processing the segment. A bytes_read count and a bytes_written count will be set to zero at initialization. Bytes_read is the amount of data actually read and bytes_written is the amount of data actually written. Additionally, a read_state parameter and a write_state parameter are set to idle at initialization. Furthermore, values of a read_size and a write_size variable may depend on the segment type being executed. For example, for tape devices the transfer size is a fixed size, while for disks, a large request may be split up into several transfers, with the last transfer being smaller than the rest.

For purposes of the description of this invention, the algorithm for setting the transfer size is not needed for understanding the overlapping data flow herein disclosed. The read_size variable is the size in bytes of the read transfer, and the write_size variable is the size in bytes of the write transfer.

At step 30, this embodiment of the method and system of this invention can issue a set of initial commands for a segment. The algorithm for issuing initial commands for a segment will be provided in greater detail below.

At step 40, the method of this invention performs a read completion operation and then at step 50, a write completion operation is performed by the method and system of this invention. At step 60, the method of this invention ends, and, at step 70, a command complete command can be returned to the host issuing the extended copy command. Step 60 and step 70 can be combined into a single step. The algorithms for the read and write completion operations are provided in more detail below.

The issuing initial commands for a segment operation of step 30 of FIG. 1 is performed in accordance with the following Algorithm listed below in pseudocode:
IF (bytes-read is greater than or equal to expected-bytes-read) THEN SET read-state to DONE ENDIF
IF (bytes-written is greater than or equal to expected-bytes-written) THEN SET write-state to DONE

```
IF read-state is DONE THEN
    EXIT-segment is done
ENDIF
ENDIF
IF (bytes-waiting is greater than the write-size)AND (write-
state is IDLE) THEN
    SET write-state to BUSY
    SET bytes-waiting to (bytes-waiting—write-size)
    issue write command to destination device for write-size
    bytes
ENDIF
IF (bytes-waiting is less than low_water_mark)AND (read-
state is IDLE) THEN
    SET read-state to BUSY
    SET read-size
    issue a read command to the source
    device for read-size bytes
ENDIF
```

Further, the read completion operation of step 40 of FIG. 1 can be performed in accordance with the following algorithm:

```
SET bytes-read to (bytes-read+read-size)
SET bytes-waiting to (bytes-waiting+read-size)
IF (bytes-read is equal to expected-bytes-read) THEN
    SET read-state to DONE
    IF (write-state is DONE)THEN
        EXIT-segment is done
    ENDIF
ELSE
    SET read-state to IDLE
ENDIF
IF (bytes-waiting is greater than the write-size) AND (write-
state is IDLE) THEN
    SET write-state to BUSY
    SET write-size
    SET bytes-waiting to (bytes-waiting-write-size)
    issue write command to destination device for write-size
    bytes
ENDIF
IF (bytes-waiting is less than low_water_mark) AND
(read-state is IDLE)THEN
    SET read-state to BUSY
    SET read-size
    issue a read command to the source device
    for read-size bytes
ENDIF
```

The write completion operation performed at step 50 of FIG. 1 can be accomplished in accordance with the following algorithm:

```
SET bytes-written to (bytes-written+write-size)
IF (bytes-written is equal to expected-bytes-written)THEN
    SET write-state to DONE
    IF (read-state is DONE)THEN
        EXIT-segment is done
    ENDIF
ELSE
    SET write-state to IDLE
ENDIF
IF (bytes-waiting is greater than the write-transfer-size)
AND (write state is IDLE) THEN
    SET write-state to BUSY
    SET write-size
    SET bytes-waiting to (bytes-waiting-write-size)
    issue write command to destination device for write-size
    bytes
ENDIF
IF (bytes-waiting is less than low_water_mark) AND
(read-state is IDLE) THEN
    SET read-state to BUSY
    SET read-size
    issue a read command to the source device for read-size
    bytes
ENDIF
```

The extended copy command specification provides for the possibility of having a read command, followed by a write command to a device which will then be the source device for data in a subsequent read command, which can then be written to yet another device. In other words, a read followed by a write can be followed by a read of the data that was just written. This may typically occur across segments within an extended copy command. The method and system of this invention can account for this possibility and properly overlap read and write commands so as to maintain the streaming of data from a source device to a destination device and between multiple source and destination devices, even across extended copy command segments.

In the case of overlapping data flow across extended copy command segments, the method of this invention takes the step of ensuring that a write of data to a destination device occurs before read of the same data from that device is initiated. In other words, the method of this invention ensures that data to be read is present at a source device before reading the same data from that device in the event a write of the data is in progress. An important technical advantage of the present invention is thus the increased speed of data flow between source devices and destination devices, even in the case of multiple source devices and multiple destination devices, and across extended copy command segments.

Further, because of the streaming nature of the data flow possible with the present invention, data can be kept streaming to a streaming target device, such as a tape backup device, so as to reduce or eliminate the mechanical starts and stops that can occur with current implementations of the extended (or any) backup copy command. In this way, the stopping and repositioning of a tape drive, which is an inherently time and resource consuming mechanical operation, can be reduced or eliminated. The result is an increase in efficiency and data transfer speeds. The method and system of this invention can accept and process extended copy commands from host devices on either the Fibre Channel side or the SCSI side of a Fibre Channel-to-SCSI network.

Figure 2:
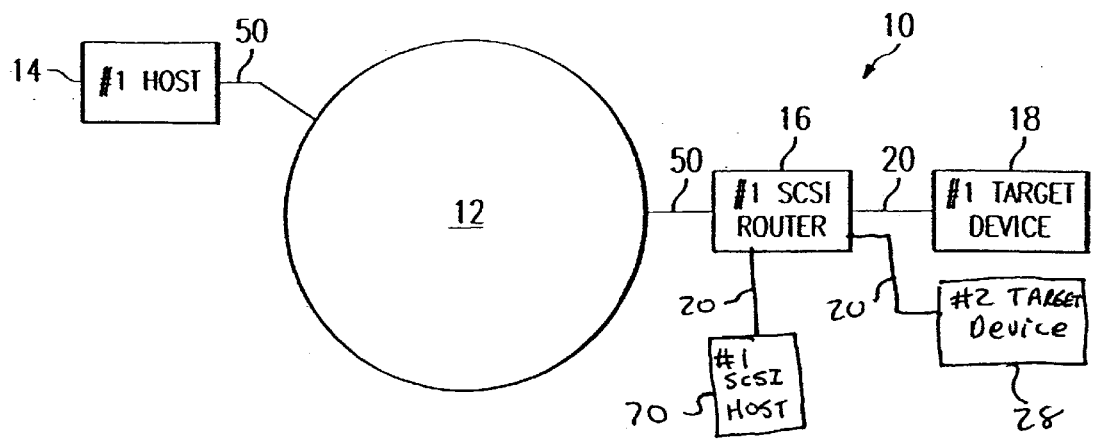
FIG. 2 is a conceptual diagram of a Fibre Channel-to-SCSI network 10 for implementing one embodiment of the method and system of this invention.

FIG. 2 is a conceptual diagram of a Fibre Channel-to-SCSI network in which one embodiment of the method and system of this invention can be implemented. In FIG. 2, there appears a conceptual diagram of Fibre Channel network 10 that can include network link 12 for connecting #1 Fibre Channel host 14 with #1 Fibre Channel-to-SCSI router 16 via network links 50. #1 target device 18 and #2 target device 28 connect to #1 Fibre Channel-to-SCSI router 16 via SCSI network links 20. FIG. 2 also includes #1 SCSI host 70, connected to #1 Fibre Channel-to-SCSI router 16 via a second SCSI network link 20. Network links 50 can be any Fibre Channel network connection and SCSI network links 20 can be any SCSI network connection.

FIG. 2 shows a simple one Fibre Channel host, one SCSI host, one target and one router Fibre Channel-to-SCSI network, but the method and system of this invention can be implemented in a Fibre Channel-to-SCSI network having multiple Fibre Channel hosts, multiple SCSI hosts, multiple Fibre Channel-to-SCSI routers and multiple network target devices. The target devices can be either source or destination devices, such as tape drives, CD-ROMs, hard drives, or other storage devices as known to those in the art.

In operation, either #1 Fibre Channel host 14 or #1 SCSI host 70 can issue an extended copy command to #1 Fibre Channel-to-SCSI router 16. #1 Fibre Channel-to-SCSI router 16 can then execute the command, for example, a backup command involving #1 target device 18 and #2 target device 28.

Figure 3:
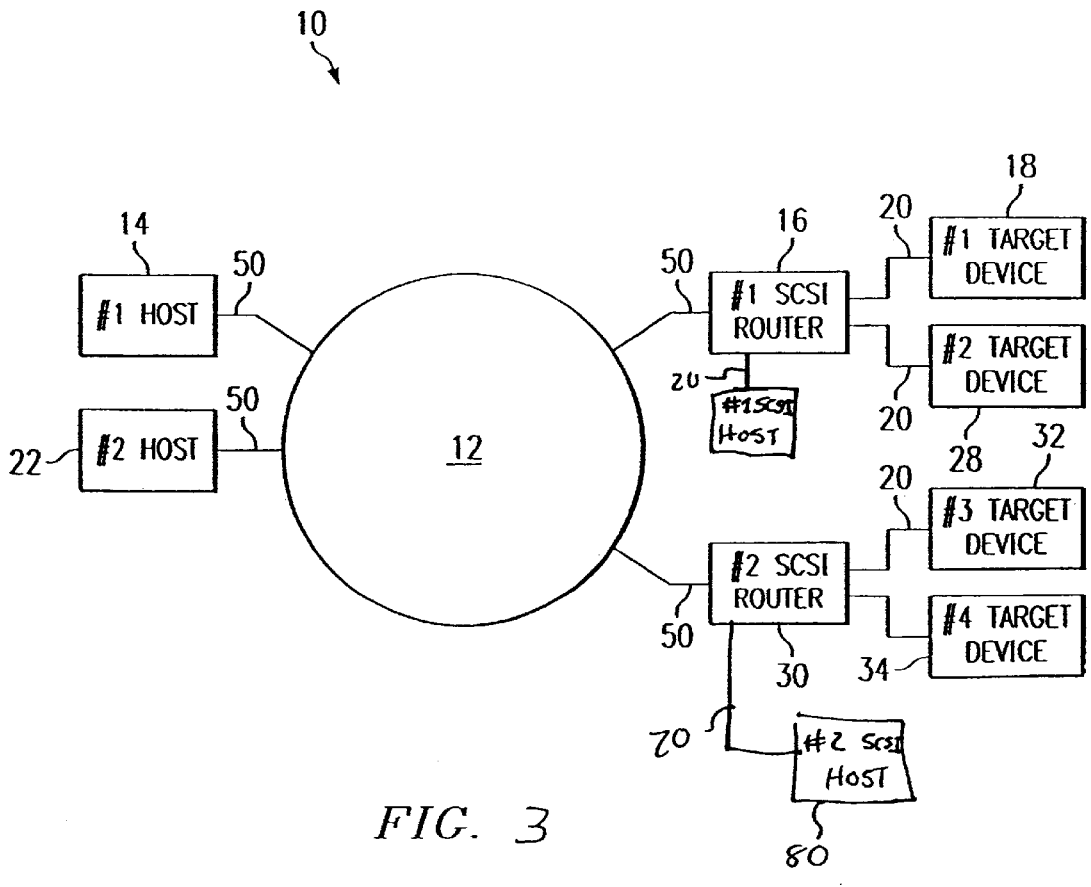
FIG. 3 is a conceptual diagram of a Fibre Channel-to-SCSI network for implementing an embodiment of the method and system of this invention, wherein the network has multiple hosts, multiple routers and multiple target devices.

FIG. 3 shows a modified Fibre Channel network 10 to illustrate the capability of the present invention to process extended copy commands from multiple Fibre Channel and/or SCSI hosts to multiple target devices using multiple Fibre Channel-to-SCSI routers. Fibre Channel network 10 now includes #2 Fibre Channel host 22 and #2 Fibre Channel-to-SCSI router 30 communicatively connected to Fibre Channel network link 12 via network links 50.

Fibre Channel network 10 also includes #2 SCSI host 80, communicatively connected to #2 SCSI router 30 via a network link 20. Further, #2 SCSI router 30 is communicatively connected to #3 target device 32 and #4 target device 34 via networks links 20.

FIG. 3 shows a closed Fibre Channel network 10, but it is possible to add additional SCSI routers, Fibre Channel hosts, SCSI hosts and target devices to Fibre Channel network 10. Such a modification is contemplated as within the scope of this invention. The method and system of the present invention can thus function equally well in a network having multiple hosts, multiple routers and multiple target devices. The number of routers, target devices and hosts is limited by the router, and the SCSI and Fibre Channel network protocol capacity.

The method and system of the present invention can be used in combination with the invention disclosed in related U.S. patent application entitled "Method And System For Reconciling Extended Copy Command Target Descriptor Length," Ser. No. "unassigned," filed on Feb. 28, 2002 to John Tyndall, which is hereby fully incorporated by reference.

The present invention can provide the functionality disclosed in this description in applications involving networks in which different hosts may each use different specification extended copy commands. For example, one host may use the Legato implementation while another host within the same network can use the 143r1 specification extended copy command.

The combination of the present invention with that disclosed in the above-referenced application is contemplated as being within the scope of the present invention.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for overlapping data flow within an extended copy command over a network, comprising, at a router in said network:

receiving an extended copy command from a first host to a first target device;

if the network status is unknown, determining an initial network status;

initializing a set of read-write parameters; and executing said extended copy command for a first segment of said extended copy command and for one or more subsequent segments by overlapping one or more read and one or more write commands of said extended copy command, comprising:

issuing a set of initial commands for a first segment of said extended copy command;

issuing a subsequent set of initial commands for each subsequent segment of said extended copy command as each of said subsequent commands is received;

performing a read completion operation for each segment of the extended copy command; and performing a write completion operation for each segment of the extended copy command, wherein said read completion operation and said write completion operation for each segment can be out of sequence to the order in which each segment was received.

2. The method of claim 1, wherein said extended copy command is a SCSI (Small Computer System Interface) extended copy command, said router is a Fibre Channel-to-SCSI router and said network is a Fibre Channel-to-SCSI storage area network.

3. The method of claim 1, wherein said set of read-write parameters comprises a bytes_read count, a bytes_written count, a read_state parameter and a write_state parameter.

4. The method of claim 3, wherein initializing said bytes_read count and said bytes_written count comprises setting both to zero, and wherein initializing said read_state parameter and said write_state parameter comprises setting both to idle.

5. The method of claim 1, wherein issuing said set of initial commands and issuing said set of subsequent initial commands comprises executing an initial commands algorithm.

6. The method of claim 1, wherein performing said read completion operation comprises executing a read completion algorithm.

7. The method of claim 1, wherein performing said write completion operation comprises executing a write completion algorithm.

8. The method of claim 1, further comprising issuing a command complete command to said first host upon completing said extended copy command.

* * * * *